(12) United States Patent
Brown

(10) Patent No.: US 8,076,900 B1
(45) Date of Patent: Dec. 13, 2011

(54) PORTABLE BATTERY CHARGER

(76) Inventor: Audley Brown, Miami, FL (US)

(*) Notice: Subject to any disclaimer, the term of this patent is extended or adjusted under 35 U.S.C. 154(b) by 480 days.

(21) Appl. No.: 12/405,312

(22) Filed: Mar. 17, 2009

Related U.S. Application Data

(63) Continuation-in-part of application No. 11/408,709, filed on Apr. 21, 2006, now abandoned.

(51) Int. Cl.
H02J 7/14 (2006.01)
(52) U.S. Cl. ........................................................ 320/105
(58) Field of Classification Search .................... 320/105
See application file for complete search history.

(56) References Cited

U.S. PATENT DOCUMENTS

| 4,161,682 A * | 7/1979 | Corvette ....................... 320/105 |
| 4,595,841 A | 6/1986 | Yaguchi |
| 4,902,955 A | 2/1990 | Manis et al. |
| 5,162,662 A | 11/1992 | Nakayama |
| 5,212,952 A | 5/1993 | Yokoyama et al. |
| 5,444,592 A | 8/1995 | Shimizu et al. |
| 5,982,138 A * | 11/1999 | Krieger ......................... 320/105 |
| 5,998,961 A | 12/1999 | Brown |
| 6,002,235 A * | 12/1999 | Clore ............................. 320/105 |
| 6,155,870 A * | 12/2000 | Valentine ...................... 439/504 |
| 6,577,098 B2 * | 6/2003 | Griffey et al. ................. 320/104 |
| 7,301,303 B1 * | 11/2007 | Hulden et al. ................ 320/105 |

* cited by examiner

Primary Examiner — Edward Tso
Assistant Examiner — M'Baye Diao
(74) Attorney, Agent, or Firm — Albert Bordas, P.A.

(57) ABSTRACT

A portable battery charger, comprising a base assembly housing a first electrical system. The first electrical system comprises a first rechargeable battery with a respective first booster cable port. The first booster cable port has first receiving means to receive removable booster cables. The first electrical system has first recharging means to recharge the first rechargeable battery. The base assembly also houses an air compressor system. The air compressor system comprises an air compressor having means to deliver compressed air through a hose to a valve stem fitting. A head assembly houses a second electrical system. The second electrical system comprises a second rechargeable battery with a respective second booster cable port. The second booster cable port has second receiving means to receive the removable booster cables. The second electrical system has second recharging means to recharge the second rechargeable battery. The head assembly removably mounts onto the base assembly.

20 Claims, 3 Drawing Sheets

PORTABLE BATTERY CHARGER

OTHER RELATED APPLICATIONS

The present application is a continuation-in-part of U.S. patent application Ser. No. 11/408,709, filed on Apr. 21, 2006 now abandoned, which is hereby incorporated by reference.

BACKGROUND OF THE INVENTION

1. Field of the Invention

The present invention relates to charging systems, and more particularly, to a portable battery charger.

2. Description of the Related Art

Many battery chargers have been developed in the past. Applicant believes that one of the closest references corresponds to his own U.S. Pat. No. 5,998,961 issued on Dec. 7, 1999 for a portable battery charger. However, it differs from the present invention because in that invention, Brown teaches a portable battery charger for jump-starting an engine of a disabled vehicle including a main housing having a motor and a generator disposed therein. The main housing includes gasoline and oil intake portions in communication with the motor. A pair of cables extends outwardly from one of the sidewalls of the main housing. The pair of cables is in communication with the generator. The pair of cables each has a spring-loaded clip disposed on free ends thereof for operative coupling with positive and negative terminals of a battery.

Applicant believes that another reference corresponds to U.S. Pat. No. 5,212,952 issued to Yokoyama, et al. on May 25, 1993 for a compact power supply and lubricant-affording device therefore. However, it differs from the present invention because Yokoyama, et al. teach a compact portable electrical generator powered by a gas fueled internal combustion engine. A combined starter and generator are coupled to the engine for starting of the engine and for generating electrical power when the engine is running. The engine includes a lubricating system including lubricant that is supplied from a separately insertable lubricant cartridge and which is pumped by a hose compressing type of pump so as to insure adequate delivery of small amounts of lubricant regardless of the orientation of the unit and also so as to insure that lubricant cannot leak from the system when the unit is not being operated.

Applicant believes that another reference corresponds to U.S. Pat. No. 5,162,662, issued to Nakayama on Nov. 10, 1992 for a compact power supply with gas engine. However, it differs from the present invention because Nakayama teaches a compact portable power supply including an internal combustion engine that drives a generator and which engine is fueled by a pressurized source of gaseous fuel. The outer housing and control structure is configured in such a way that the source of gaseous fuel will always be oriented so that liquid fuel will not be delivered to the engine when the power supply is in use.

Applicant believes that another reference corresponds to U.S. Pat. No. 4,595,841, issued to Yaguchi on Jun. 17, 1986 for a full-covered portable generator. However, it differs from the present invention because Yaguchi teaches a full-covered portable generator composed of a generator core, an engine for driving the generator core enclosed by a cover comprising discrete front, rear and bottom cover elements. The rear cover element is detachably joined to the rear cover element along lateral peripheral surfaces of the generator. The engine and its main components are each covered at least in part by the front cover element in a manner that they are exposed when the rear cover element is detached from the front cover element, for facilitation of the maintenance thereof. Various controls and readouts or displays are arranged on the front cover element transversely of the generator, preferably in an order corresponding to the required order in which they are operated or read. A carrying handle is arranged on an upper surface of the front cover element and extends transversely of the generator.

Applicant believes that another reference corresponds to U.S. Pat. No. D309,892, issued to Troup on Aug. 14, 1990 for a portable generator for charging automobile batteries.

Applicant believes that another reference corresponds to U.S. Pat. No. 4,902,955, issued to Manis, et al. on Feb. 20, 1990 for a portable battery charger. However, it differs from the present invention because Manis, et al. teach an improved portable battery charger (10) for boosting and charging automotive-type batteries. The battery charger (10) comprises rectifier means (34), an automotive-type battery (20), and an air compressor (24) powered by the battery (20) received within a charger housing (12). Positive and negative charging cables (30) and (28), respectively are retractably received within first and second cable housings (14) and (16), respectively. The first and second cable housings are positioned adjacent oppositely disposed external walls of the charger housing (12) and are dimensioned such that the positive and negative charging clamps (76) and (70), respectively may be slidably positioned over saddle notches (72) defined by the cable housings when the charging cables are fully retracted into the cable housings whereby the charging clamps (76) and (70) are physically isolated from each other by the charger housing (12), thereby preventing accidental contact between the clamps. When connected to a source of AC power, the rectifier means (34) provides a DC charging voltage to the battery (20). The charging cables are connected to the terminals of the battery (20) to permit the boosting or jump-starting of a vehicle with a dead battery when AC power is not conveniently available.

Applicant believes that another reference corresponds to U.S. Pat. No. 5,444,592, issued to Shimizu, et al. on Aug. 22, 1995 for a portable power unit. However, it differs from the present invention because Shimizu, et al. teach a portable power unit that has a protective circuit for cutting off an output current from the power unit when the power unit is in an overload state. An amount of the output current is detected. An output voltage from the power unit is reduced when the amount of the output current detected reaches a first threshold value, thereby preventing the protective circuit from undesirably operating for one power unit when it is connected for another for parallel operation. When the amount of the output current decreases to a second threshold value, which is smaller than the first threshold value, with the power unit being in a state in which the output voltage is reduced, the voltage-reducing operation is canceled.

Other patents describing the closest subject matter provide for a number of more or less complicated features that fail to solve the problem in an efficient and economical way. None of these patents suggest the novel features of the present invention.

SUMMARY OF THE INVENTION

The instant invention is a portable battery charger, comprising a base assembly housing a first electrical system. The first electrical system comprises a first rechargeable battery with a respective first booster cable port. The first booster cable port has first receiving means to receive removable booster cables. The first electrical system has first recharging means to recharge the first rechargeable battery. The base assembly also houses an air compressor system. The air compressor system comprises an air compressor having means to deliver compressed air through a hose to a valve stem fitting.

A head assembly houses a second electrical system. The second electrical system comprises a second rechargeable battery with a respective second booster cable port. The second booster cable port has second receiving means to receive the removable booster cables. The second electrical system has second recharging means to recharge the second rechargeable battery. The head assembly removably mounts onto the base assembly.

The first recharging means comprises a first at least one cigarette lighter socket and/or a first removable accessory power cord. The second recharging means comprises at least one electrical outlet and/or a second at least one cigarette lighter socket and/or a second removable accessory power cord.

The second rechargeable battery makes electrical contact with the first rechargeable battery when the head assembly is mounted onto the base assembly. The first electrical system further comprises a fan assembly, a voltmeter, and a first reverse polarity sensor. The second electrical system further comprises a voltage tester, a second reverse polarity sensor. The second electrical system further comprises the at least one electrical outlet fixed upon the head assembly. The second electrical system further comprises a third rechargeable battery that powers illuminating means fixed upon the head assembly. The illuminating means is a light-emitting diode.

It is therefore one of the main objects of the present invention to provide a portable battery charger for jump-starting an engine of a disabled vehicle.

It is another object of this invention to provide a portable battery charger to be used for camping and/or emergency purposes.

It is another object of this invention to provide a portable battery charger that allows a user to recharge a vehicle battery in about 10 minutes while inside the vehicle. This feature brings a friendlier approach to elderly, and/or disabled vehicle owners.

It is another object of this invention to provide a portable battery charger that is volumetrically efficient for carrying, transporting, and storage.

It is another object of this invention to provide a portable battery charger that can be readily assembled and disassembled without the need of any special tools.

It is another object of this invention to provide a portable battery charger, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
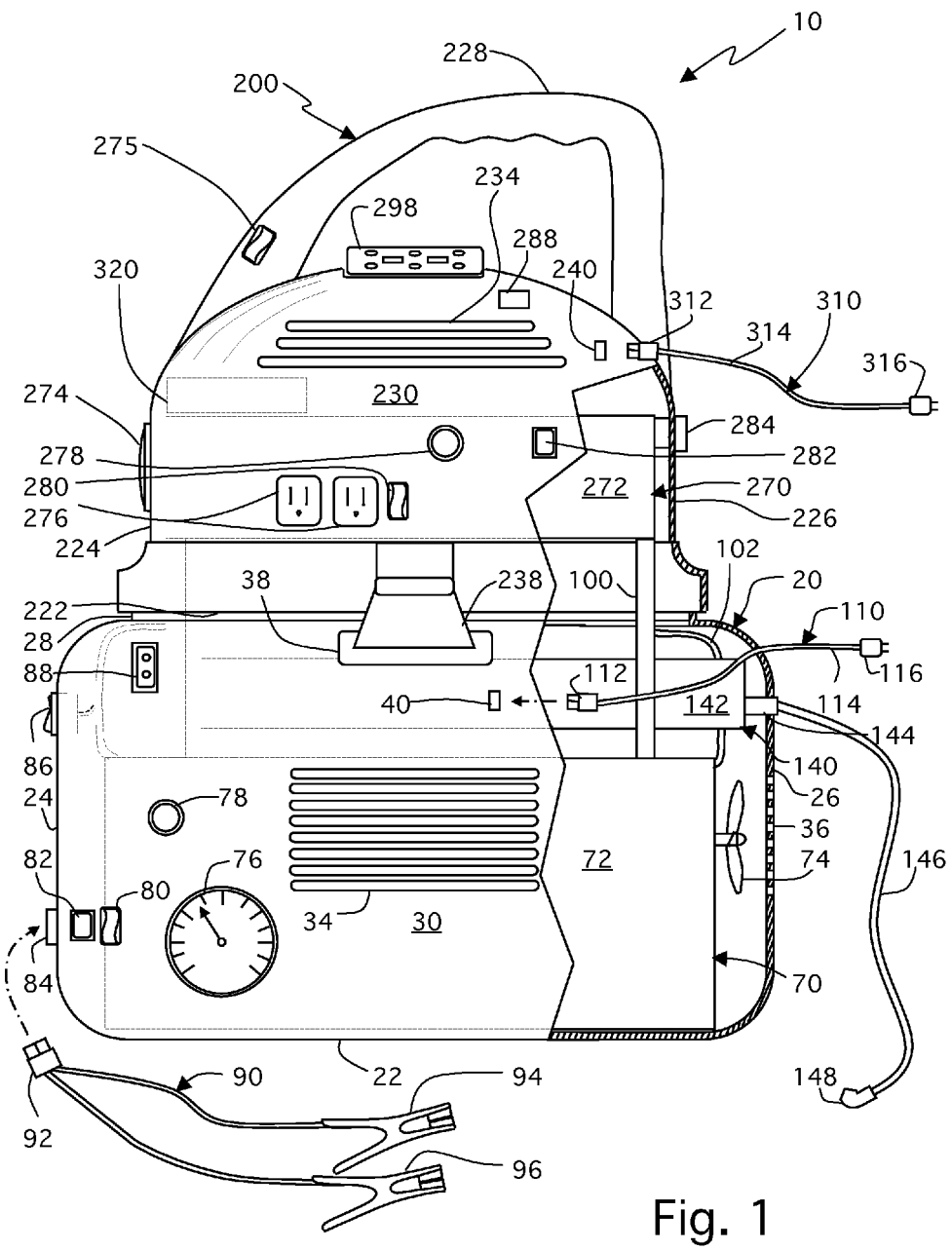
FIG. 1 is a left-side elevation view of the instant invention, which has been partially cross-sectioned to show an interior section.

Referring now to the drawings, the present invention is generally referred to with numeral 10. It can be observed that it basically includes base assembly 20, electrical assembly 70, air compressor system 140, head assembly 200, and electrical system 270.

Figure 2:
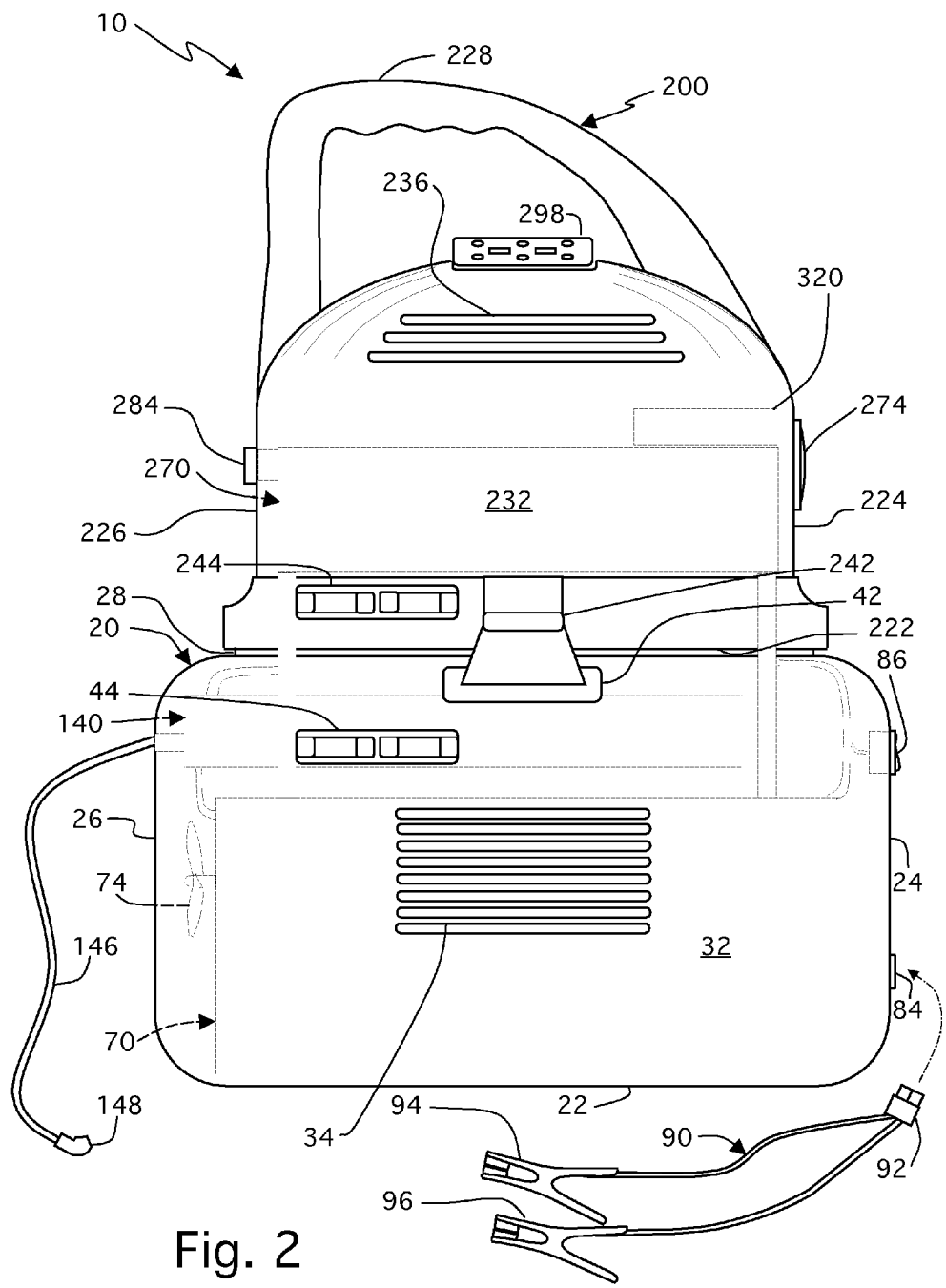
FIG. 2 is a right-side elevation view of the instant invention.

As seen in FIGS. 1, 2, 3, and 4 base assembly 20 comprises base wall 22, sidewalls 24 and 26, front wall 30, rear wall 32, best seen in FIG. 2, and edge 28. Front wall 30 and rear wall 32 comprise vents 34 for ventilation of electrical assembly 70 and air compressor system 140. Sidewall 26 comprises vent 36 for additional ventilation of electrical assembly 70 and air compressor system 140.

Base assembly 20 houses electrical system 70. Electrical system 70 comprises rechargeable battery 72. Electrical system 70 further comprises booster cable port 84, cigarette lighter socket 78, and port 40. Booster cable port 84 removably receives booster cable assembly 90. Booster cable assembly 90 comprises plug 92 that is of a cooperative shape and dimension to insert into booster cable port 84. Booster cable assembly 90 also comprises positive clamp 94 and negative clamp 96 for operative coupling with positive and negative terminals of a battery such as that of a vehicle.

Cigarette lighter socket 78 serves as one form of recharging means for rechargeable battery 72, whereby a two-ended cigarette lighter plug cable, not seen, can be connected from cigarette lighter socket 78 to the vehicle's cigarette lighter. Similarly, in the event of an emergency or foul weather, from within the vehicle the two-ended cigarette lighter plug cable can be connected from cigarette lighter socket 78 to the vehicle's cigarette lighter to recharge the vehicle's battery. In addition, port 40 receives accessory power cord 110 as another form of recharging means for rechargeable battery 72, whereby power may be fed from an AC power source. Accessory power cord 110 comprises plug 112, cable 114 and plug 116.

Electrical system 70 further comprises fan assembly 74, battery voltmeter 76, switch 80, reverse polarity sensor 82, switch 86 and indicator 88. Fan assembly 74 operates whenever rechargeable battery 72 is operating. Fan assembly 74 removes hot air produced from within base assembly 20 and expels is through vents 34 and 36. Voltmeter 76 measures an electrical potential difference between two points in an electric circuit. Switch 80 is an "on/off" switch to operate rechargeable battery 72. Reverse polarity sensor 82 checks for reversed polarity when booster cable assembly 90 is utilized, and specifically the placement of positive clamp 94 and negative clamp 96. Switch 86 is an "on/off" switch to power rechargeable batteries 72 or 272 when head assembly 200 is mounted onto base assembly 20. Indicator 88 illuminates when rechargeable battery 272 makes electrical contact with rechargeable battery 72 when head assembly 200 is mounted onto base assembly 200, whereby contact posts 100 are mounted to rechargeable battery 72 and electrically connected thereto with electrical wires 102.

Base assembly 20 also houses air compressor system 140. Air compressor system 140 comprises air compressor 142 and means to deliver compressed air through hose outlet 144 and hose 146 to valve stem fitting 148.

Head assembly 200 is removably mounted onto base assembly 20. Head assembly 200 comprises edge 222 of cooperative dimensions and shape to snugly mount around edge 28 of base assembly 20. Head assembly housing 200 comprises sidewalls 124 and 126, front wall 230, and rear wall 232, best seen in FIG. 2. Handle assembly 228 extends from head assembly 200. Locking members 238 and 242 are disposed at front and rear walls 30 and 32 respectively, and at a cooperative disposition to engage apertures 38 and 42 of base assembly 20.

Head assembly 200 houses electrical system 270. Electrical system 270 comprises rechargeable battery 272. Electrical system 270 further comprises booster cable port 284, cigarette lighter socket 278, and port 240. Booster cable port 284 removably receives booster cable assembly 90. Reverse polarity sensor 282 checks for reversed polarity when booster cable assembly 90 is utilized, and specifically the placement of positive clamp 94 and negative clamp 96.

Electrical outlets 276 serve as one form of recharging means for rechargeable battery 272, whereby power may be fed from a power source via an electrical cord, not seen. Switch 280 is an "on/off" switch to operate electrical outlets 276. Automatic reset fuse 288 is activated in the event that there is excess current to electrical outlets 276. Cigarette lighter socket 278 serves as another form of recharging means for rechargeable battery 272, whereby the two-ended cigarette lighter plug cable, not seen, can be connected from cigarette lighter socket 278 to the vehicle's cigarette lighter. Similarly, in the event of an emergency or foul weather, from within the vehicle the two-ended cigarette lighter plug cable can be connected from cigarette lighter socket 278 to the vehicle's cigarette lighter to recharge the vehicle's battery. In addition, port 240 receives accessory power cord 310 as yet another form of recharging means for rechargeable battery 272, whereby power may be fed from an AC power source. Accessory power cord 310 comprises plug 312, cable 314 and plug 316. Voltage tester 298 can help determine whether there is current flowing through a wire and test for grounding.

Rechargeable battery 272 makes electrical contact with rechargeable battery 72 when head assembly 200 is mounted onto base assembly 20, whereby contact posts 100 are mounted to rechargeable battery 72 and electrically connected thereto with electrical wires 102. In a preferred embodiment, four contact posts 100 are mounted next to upper corners of rechargeable battery 72. Contact posts 100 make the electrical contact with rechargeable battery 72.

Electrical system 270 further comprises rechargeable battery 320. Rechargeable battery 320 powers illuminating means fixed upon said head assembly 200. Said illuminating means can be light-emitting diode 274. Switch 275 is an "on/off" switch to operate light-emitting diode 274.

As best seen in FIG. 2, T-hangers 44 are mounted to rear wall 32, and T-hangers 244 are mounted to rear wall 232. T-hangers 44 and 244 may be used to coil or suspend booster cable assembly 90 therefrom.

Figure 3:
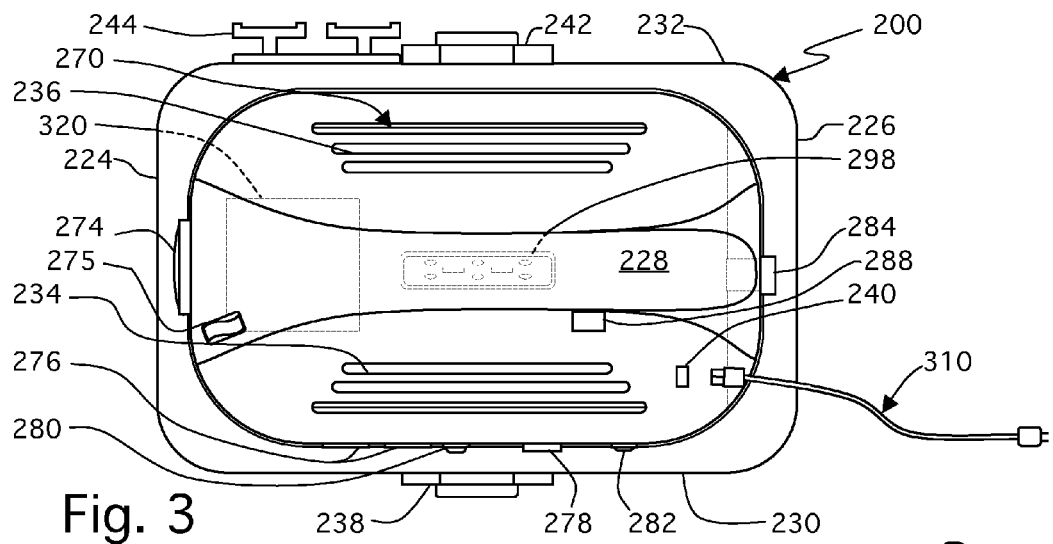
FIG. 3 is a top plan view of a head assembly of the present invention.

As best seen in FIG. 3, front wall 30 and rear wall 32 comprise apertures 38 and 42 respectively at a predetermined distance from edge 28. In addition, as best seen in this illustration, front wall 230 has vents 234, and rear wall 232 has vents 236.

Figure 4:
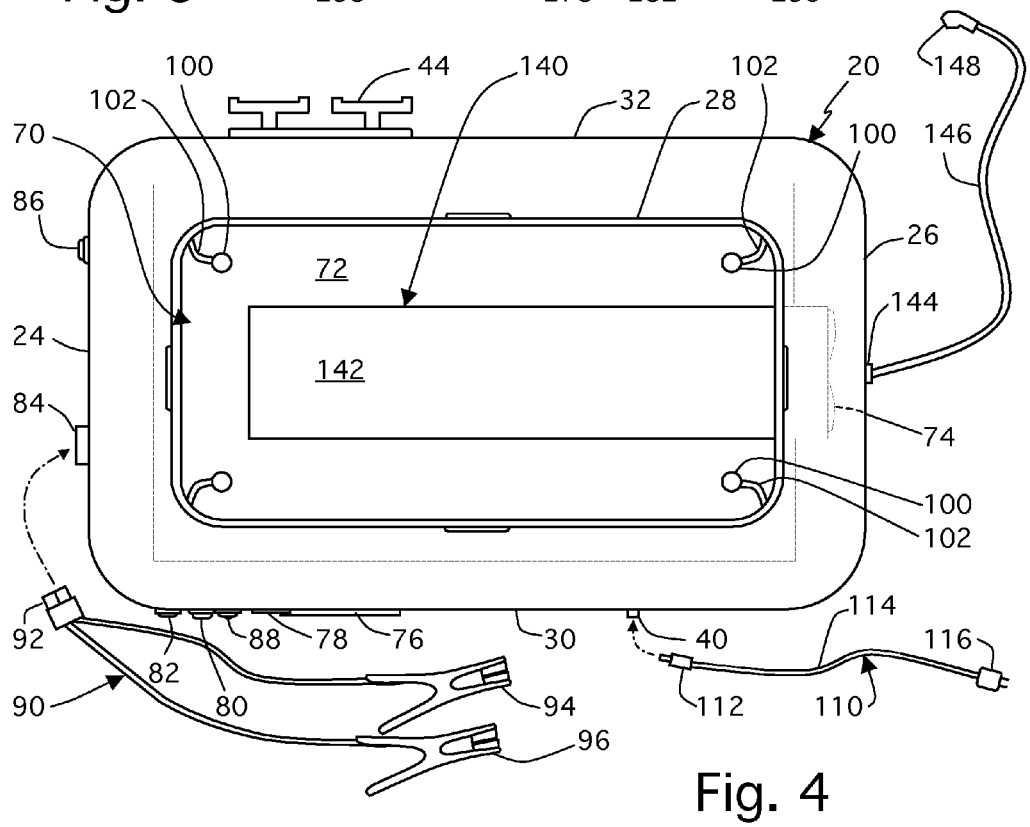
FIG. 4 is a top plan view of a base assembly of the present invention.

As best seen in FIG. 4, base assembly 20 comprises edge 28 defining an opening for base assembly 20. In addition, as best seen in this illustration, contact posts 100 are mounted to rechargeable battery 72 and electrically connected thereto with electrical wires 102. As described above, in the preferred embodiment, four contact posts 100 are mounted next to upper corners of rechargeable battery 72 and contact posts 100 make the electrical contact with rechargeable battery 72.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable battery charger, comprising:
   A) a base assembly housing a first electrical system, said first electrical system comprising a first rechargeable battery with a respective first booster cable port, said first booster cable port having first receiving means to receive removable booster cables, said first electrical system having first recharging means to recharge said first rechargeable battery, said base assembly also housing an air compressor system, said air compressor system comprising an air compressor having means to deliver compressed air through a hose to a valve stem fitting; and
   B) a head assembly housing a second electrical system, said second electrical system comprising a second rechargeable battery with a respective second booster cable port, said second booster cable port having second receiving means to receive said removable booster cables, said second electrical system having second recharging means to recharge said second rechargeable battery, said head assembly removably mounts onto said base assembly.

2. The portable battery charger set forth in claim 1, further characterized in that said first recharging means comprises at least one cigarette lighter socket.

3. The portable battery charger set forth in claim 1, further characterized in that said first recharging means comprises a removable accessory power cord.

4. The portable battery charger set forth in claim 1, further characterized in that said second recharging means comprises at least one electrical outlet.

5. The portable battery charger set forth in claim 1, further characterized in that said second recharging means comprises at least one cigarette lighter socket.

6. The portable battery charger set forth in claim 1, further characterized in that said second recharging means comprises a removable accessory power cord.

7. The portable battery charger set forth in claim 1, further characterized in that said second rechargeable battery makes electrical contact with said first rechargeable battery when said head assembly is mounted onto said base assembly.

8. The portable battery charger set forth in claim 1, further characterized in that said first electrical system further comprises a fan assembly.

9. The portable battery charger set forth in claim 1, further characterized in that said first electrical system further comprises a voltmeter.

10. The portable battery charger set forth in claim 1, further characterized in that said first electrical system further comprises a reverse polarity sensor.

11. The portable battery charger set forth in claim 1, further characterized in that said second electrical system further comprises a voltage tester.

12. The portable battery charger set forth in claim 1, further characterized in that said second electrical system further comprises a reverse polarity sensor.

13. The portable battery charger set forth in claim 1, further characterized in that said second electrical system further comprises at least one electrical outlet fixed upon said head assembly.

14. The portable battery charger set forth in claim 1, further characterized in that said second electrical system further comprises a third rechargeable battery.

15. The portable battery charger set forth in claim 14, further characterized in that said third rechargeable battery powers illuminating means fixed upon said head assembly.

16. The portable battery charger set forth in claim 15, further characterized in that said illuminating means is a light-emitting diode.

17. A portable battery charger, comprising:
A) a base assembly housing a first electrical system, said first electrical system comprising a first rechargeable battery with a respective first booster cable port, said first booster cable port having first receiving means to receive removable booster cables, said first electrical system having first recharging means to recharge said first rechargeable battery, said base assembly also housing an air compressor system, said air compressor system comprising an air compressor having means to deliver compressed air through a hose to a valve stem fitting, said first recharging means comprises a first at least one cigarette lighter socket and a first removable accessory power cord; and
B) a head assembly housing a second electrical system, said second electrical system comprising a second rechargeable battery with a respective second booster cable port, said second booster cable port having second receiving means to receive said removable booster cables, said second electrical system having second recharging means to recharge said second rechargeable battery, said head assembly removably mounts onto said base assembly, said second recharging means comprises at least one electrical outlet, a second at least one cigarette lighter socket, and a second removable accessory power cord.

18. The portable battery charger set forth in claim 17, further characterized in that said second rechargeable battery makes electrical contact with said first rechargeable battery when said head assembly is mounted onto said base assembly.

19. The portable battery charger set forth in claim 17, further characterized in that said first electrical system further comprises a fan assembly, a voltmeter, and a reverse polarity sensor.

20. The portable battery charger set forth in claim 17, further characterized in that said second electrical system further comprises a voltage tester, a reverse polarity sensor, said second electrical system further comprises a third rechargeable battery that powers a light-emitting diode fixed upon said head assembly.

* * * * *